(12) United States Patent
Desiderio et al.

(10) Patent No.: US 9,013,326 B2
(45) Date of Patent: Apr. 21, 2015

(54) METHOD AND SYSTEM FOR DETERMINING THE OCCUPATION STATE OF A PARKING SPACE

(75) Inventors: Alfonso Desiderio, Cogoleto (IT); Silvio Merli, Genoa (IT)

(73) Assignee: Selex Elsag S.p.A., Genoa (IT)

( * ) Notice: Subject to any disclaimer, the term of this patent is extended or adjusted under 35 U.S.C. 154(b) by 669 days.

(21) Appl. No.: 13/205,451

(22) Filed: Aug. 8, 2011

(65) Prior Publication Data

US 2012/0062393 A1    Mar. 15, 2012

(30) Foreign Application Priority Data

Aug. 9, 2010    (IT) .............................. TO2010A0684

(51) Int. Cl.
| | | |
|---|---|---|
| *B60Q 1/48* | (2006.01) | |
| *G08G 1/14* | (2006.01) | |
| *G01S 7/00* | (2006.01) | |
| *G01S 13/34* | (2006.01) | |
| *H04L 27/02* | (2006.01) | |
| *G01S 13/93* | (2006.01) | |

(52) U.S. Cl.
CPC . *G08G 1/14* (2013.01); *G01S 7/003* (2013.01); *G01S 13/34* (2013.01); *G01S 2013/9314* (2013.01); *H04L 27/02* (2013.01)

(58) Field of Classification Search
USPC ........ 340/932.2, 905, 937, 438, 425.5, 539.1, 340/539.11
See application file for complete search history.

(56) References Cited

U.S. PATENT DOCUMENTS

| | | | |
|---|---|---|---|
| 5,153,586 A | 10/1992 | Fuller | |
| 2003/0115015 A1 | 6/2003 | Kosowsky et al. | |
| 2005/0280555 A1* | 12/2005 | Warner | 340/932.2 |
| 2007/0096885 A1 | 5/2007 | Cheng et al. | |

FOREIGN PATENT DOCUMENTS

| | | |
|---|---|---|
| CN | 100466006 | 3/2009 |
| EP | 1672386 | 6/2006 |
| EP | 1936401 | 6/2008 |
| FR | 2917214 | 12/2008 |
| WO | WO 2004/055751 | 7/2004 |

OTHER PUBLICATIONS

Hui Zhang, et al. 24GHz Software-Defined Radar System for Automative Applications; Proceedings of 10th European Conference on Wireless Technology Oct. 2007 pp. 138-141.

(Continued)

*Primary Examiner* — Daryl Pope
(74) *Attorney, Agent, or Firm* — Workman Nydegger

(57) ABSTRACT

A method for determining the occupation state of a parking space, including the steps of: providing a first detection unit equipped with a frequency modulated continuous wave radar; preparing a decision unit and a second detection unit; transmitting via the radar a communication signal modulated on the basis of a first code, alternatively indicating the parking space or a vehicle; receiving the communication signal with the second detection unit; demodulating the first code with the second detection unit; transmitting the first code to the decision unit via the second detection unit; and determining, with the decision unit, the occupation state on the basis of the first code and the second code, alternatively indicating either a vehicle or the parking space.

16 Claims, 10 Drawing Sheets

(56) References Cited

OTHER PUBLICATIONS

European Search Report from European Application 11177038.4 dated Oct. 27, 2011.

Peli Barrenechea et al.; "FMCW radar with broadband communication capability"; Radar Conference, 2007; pp. 130-133.

Italian Search Report from Italian Application No. TO20100684 dated May 4, 2011.

\* cited by examiner

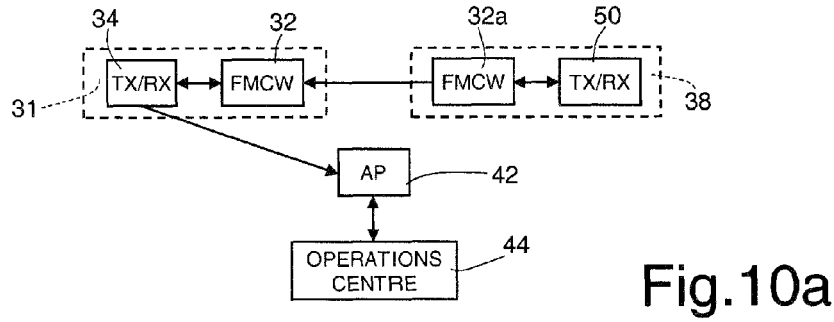
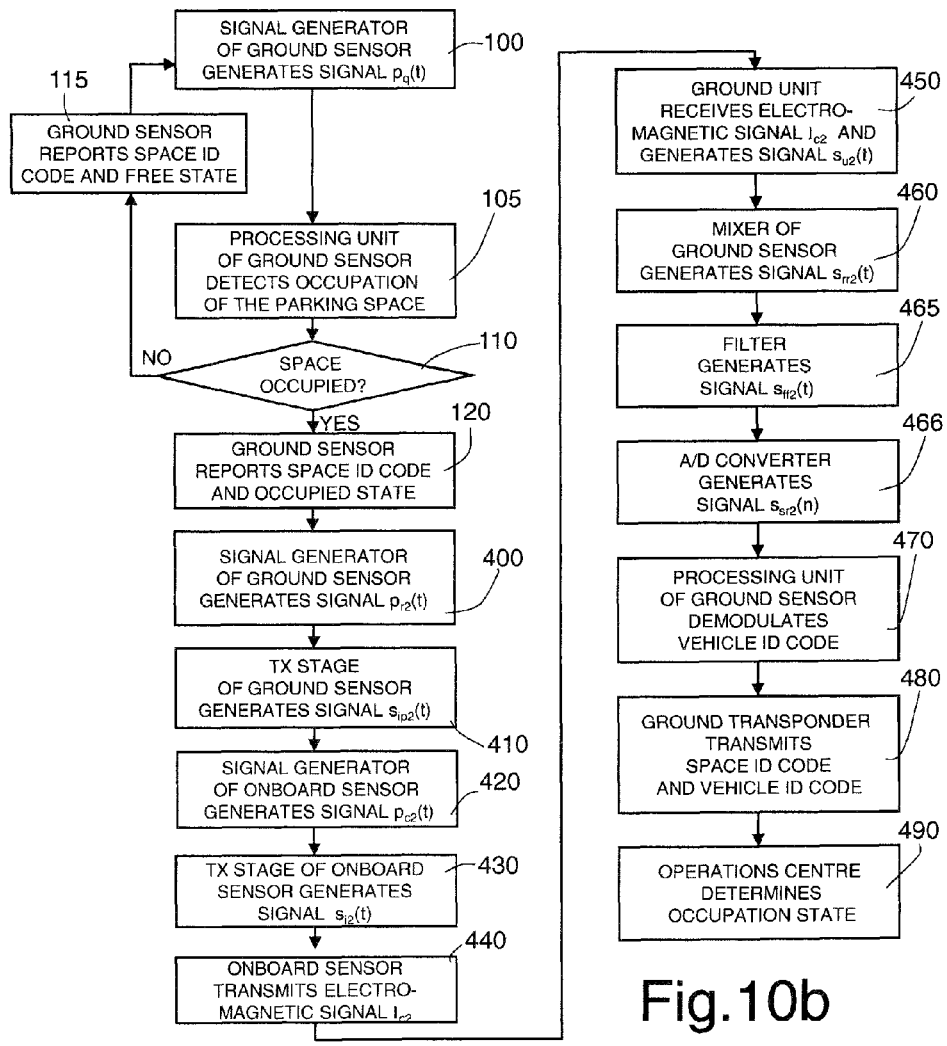
Fig.10a
Fig.10b

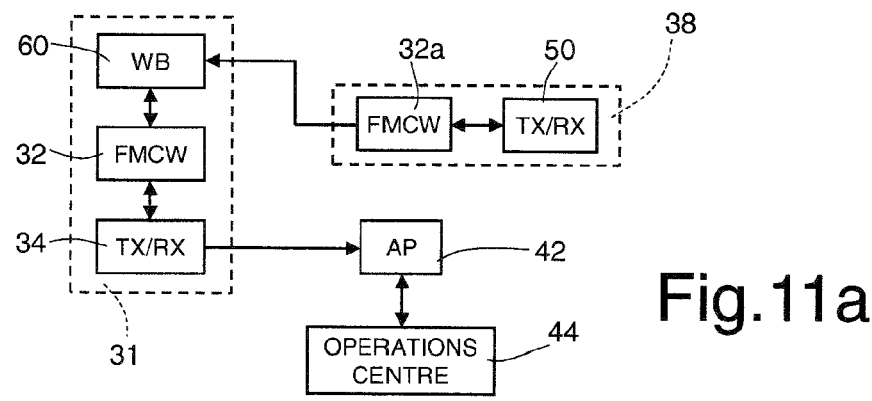
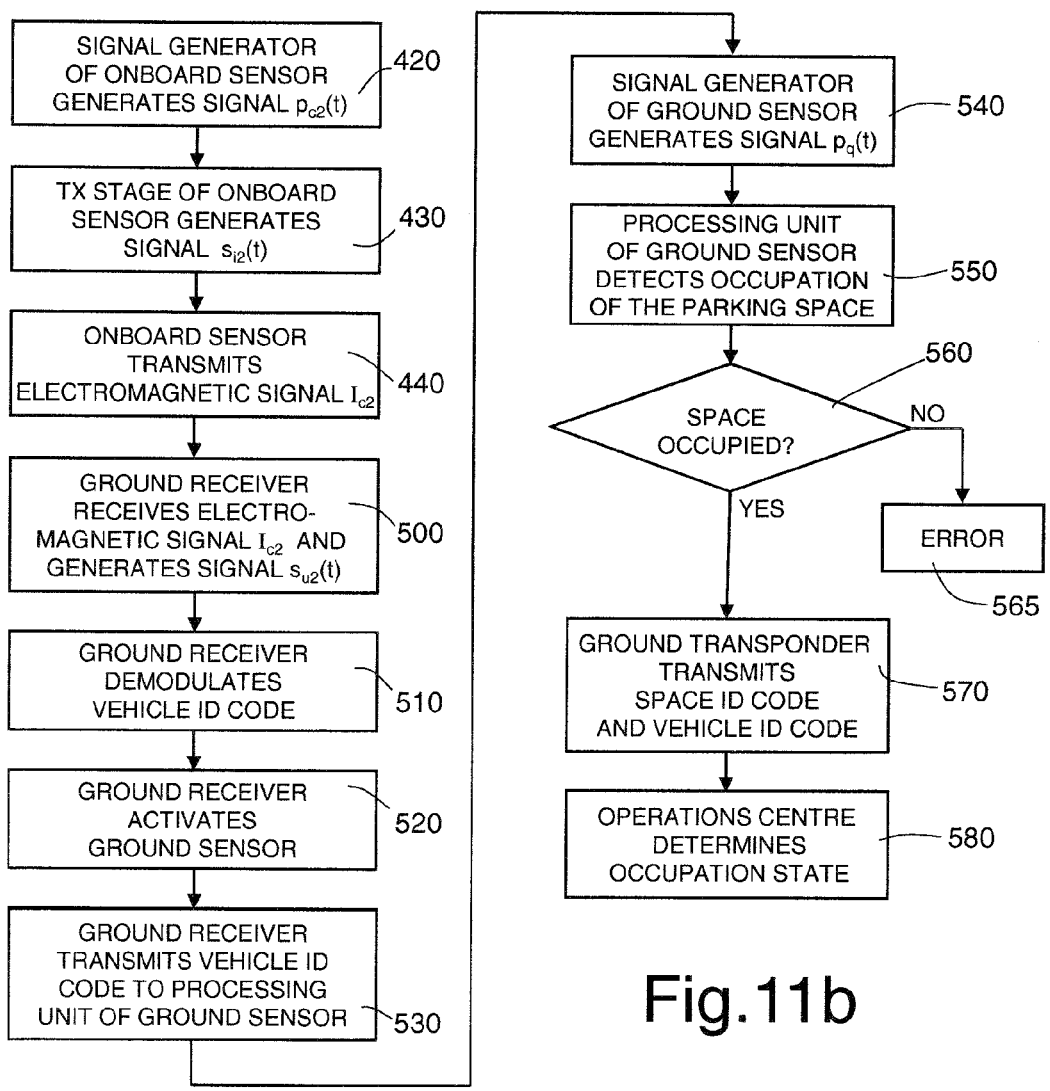
Fig.11a
Fig.11b

METHOD AND SYSTEM FOR DETERMINING THE OCCUPATION STATE OF A PARKING SPACE

The present invention relates to a method and system for determining the occupation state of a parking space.

BACKGROUND OF THE INVENTION

As is known, proximity sensors for parking lots are available today that are suitable for detecting the presence/absence of a vehicle parked within a delimited area, such as a parking space for example, generally of a rectangular shape.

For example, proximity sensors are known that are based on the use of infrared radiation, or the emission of ultrasounds, suitable for being placed on the overhead ceiling of a parking lot and therefore above the vehicles.

So-called magnetometric proximity sensors are also known, which can be buried in the ground and set up to magnetically interact with the metal masses of vehicles, in order to detect the presence of vehicles.

Proximity sensors are also available of the type described in the Italian patent application entitled "Sensore di prossimitá per area di parcheggio" ("Proximity sensor for parking lots"), filed on Jan. 4, 2009 with application number TO2009A000251. A proximity sensor based on the use of radar is described in this patent application.

In particular, as shown in FIG. 1, this patent application describes a parking lot proximity sensor 1, hereinafter referred to as the proximity sensor 1.

The proximity sensor 1 comprises a radar 2 of the so-called Frequency Modulated Continuous Wave type (FMCW).

As is known, a generic FMCW radar continually emits an electromagnetic wave, which is modulated in frequency by a modulation signal, which has in time a sawtooth or triangular waveform. The thus modulated electromagnetic wave defines an incident signal, such that in the presence of an obstacle, a reflected signal is generated by the reflection of the incident signal on the obstacle in question. The generic FMCW radar then receives the reflected signal and, mixing it with the incident signal, or rather multiplying it with the incident signal, produces a mixed signal spectrum. This spectrum has a plurality of peaks, due to the beats that are generated by the incident signal and the reflected signal. The frequencies where these peaks occur, determinable for example by means of a Fast Fourier Transform (FFT) operation, depend on, in addition to the waveform of the modulation signal, the position of the obstacle with respect to the same generic FMCW radar. The generic FMCW radar is therefore able to determine the distance of the obstacle by performing the FFT operation on the mixed signal.

Having said that, the proximity sensor 1 comprises a signal generator 4, which has a first and a second output, on which it respectively provides a pilot signal $p(t)$ and a timing signal $c(t)$.

As shown in FIG. 2, the pilot signal $p(t)$ is periodic with period $T_{p(t)}$, equal to 0.1 ms for example, i.e. with frequency $f_{p(t)}$ equal to 10 kHz for example. In particular, the pilot signal $p(t)$ may be a voltage signal having a sawtooth waveform, varying between a minimum voltage $-V_{min}$ and a maximum voltage $V_{max}$, with $V_{max}=|-V_{min}|$.

The timing signal $c(t)$ is a periodic signal with a period equal to period $T_{p(t)}$; in addition, the timing signal $c(t)$ can have a square waveform.

Still with reference to the radar 2, it comprises, in turn, a transmitting unit 6 and a receiving unit 8.

In detail, the transmitting unit 6 comprises a transmission stage 10, which is connected via a first input to the first output of the signal generator 4 and generates, on a respective output, a transmission signal $s_i(t)$ that is frequency modulated on the basis of the pilot signal $p(t)$. In particular, the transmission signal $s_i(t)$ has a constant amplitude and an instantaneous frequency $f_i(t)$ that is a function of the pilot signal $p(t)$. For example, the instantaneous frequency $f_i(t)$ may be proportional to the amplitude of the pilot signal $p(t)$ according to the relation:

$$f_i(t)=f_0+k*p(t) \tag{1}$$

where k is a constant, while $f_0$ may be, for example, equal to 24 GHz. By way of example, the constant k, minimum voltage $-V_{min}$ and maximum voltage $V_{max}$ may be such that the instantaneous frequency $f_i(t)$ is between a minimum frequency $f_{imin}$ and a maximum frequency $f_{imax}$, for example, respectively equal to 23.875 GHz and 24.125 GHz. The transmitting unit 6 further comprises a transmission antenna 12 (for example, a patch antenna), connected to the transmission unit 10 in a way to radiate an incident electromagnetic wave I having a constant amplitude and an instantaneous frequency equal to the instantaneous frequency $f_i(t)$ of the transmission signal $s_i(t)$.

Operatively, the incident electromagnetic wave I can impinge on an obstacle 14, if present. In particular, assuming that the proximity sensor 1 corresponds to a respective parking space (not shown), namely that it can detect the presence/absence of a vehicle within this respective parking space, the incident electromagnetic wave I impinges on the obstacle 14, in this case, a vehicle parked in the respective parking space, generating a reflected electromagnetic wave R.

The receiving unit 8 comprises a receiving antenna 16 (for example, a patch antenna), a mixer 18 and a low pass filter 19.

In detail, the receiving antenna 16 is able to receive signals coming from the outside, generating an acquired signal $s_u(t)$.

The mixer 18 has first and a second input, which are respectively connected to the receiving antenna 16 and to the output of the transmission stage 10, such that the mixer 18 receives as input the transmission signal $s_i(t)$ and the acquired signal $s_u(t)$. The mixer 18 then provides a mixed signal $s_r(t)$ on a respective output that is equal to the product of the transmission signal $s_i(t)$ and the acquired signal $s_u(t)$, i.e. $s_r(t)=s_i(t)*s_u(t)$.

The low pass filter 19 is connected to the mixer 18, so that it receives the mixed signal $s_r(t)$ and generates a filtered signal $s_f(t)$. Furthermore, the low pass filter 19 may have a band equal to 150 kHz, for example.

The proximity sensor 1 further comprises an analog-to-digital (A/D) converter 20, which has a first and a second input, respectively connected to the output of the low pass filter 19 and the second output of the signal generator 4, and an output. In addition, the proximity sensor 1 comprises a processing unit 22, of the microprocessor type for example, connected to the output of the A/D converter 20.

In use, the A/D converter 20 samples the filtered signal $s_f(t)$ at a sampling frequency $f_s$, generating a plurality of signal samples, namely a sampled signal $s_s(n)$. The sampling frequency $f_s$ may be a function of the frequency $f_{p(t)}$ of the pilot signal $p(t)$, namely the relation $f_s=S*f_{p(t)}$ may hold, where S as a non-integer number, so that $f_s$ and $f_{p(t)}$ are relative primes. The sampled signal $s_s(n)$ is then received by the processing unit 22.

Operatively, the acquired signal $s_u(t)$ generated by the receiving antenna 16 varies according to whether the parking space corresponding to the proximity sensor 1 is occupied or not by a vehicle. In particular, in the case where the parking space is not occupied by any vehicle, and therefore in the absence of the reflected electromagnetic wave R, the acquired signal $s_u(t)$ effectively depends on parasitic couplings present between the transmission antenna 12 and the receiving antenna 16. Vice versa, in the case where the parking space is occupied, the acquired signal $s_u(t)$ coincides in a first approximation with the reflected electromagnetic wave R. Consequently, the filtered signal $s_f(t)$ and the sampled signal $s_s(n)$ also vary according to the presence/absence of a vehicle within the parking space.

In practice, the detection of the presence of a vehicle in the parking space corresponding to the proximity sensor 1, namely the determination of the fact that the corresponding parking space is alternatively free or occupied, is entrusted to the processing unit 22.

In detail, the proximity sensor 1 transmits a number NUM of pulses during a calibration step. In particular, these NUM pulses are transmitted during a time interval in which the parking space corresponding to the proximity sensor 1 is not occupied by any vehicle.

In greater detail, during the calibration step, the signal generator 4 transmits a pilot signal p(t) formed by NUM sawteeth, therefore having a duration equal to $NUM*T_{p(t)}$. The transmission antenna 12 consequently transmits the incident electromagnetic wave I, the instantaneous frequency of which, equal to the instantaneous frequency $f_i(t)$ of the transmission signal $s_t(t)$, defines a number NUM of sawteeth; each pulse is therefore defined by a corresponding portion of the incident electromagnetic wave I, with a duration $T_{p(t)}$ and with a frequency that follows in time a waveform equal to a single sawtooth. Furthermore, during the calibration step, the proximity sensor 1 acquires a sampled signal $s_s(n)$ that, in a first approximation, is a function of just the NUM pulses transmitted, since there is no reflected electromagnetic wave R. The processing unit 22 then calculates a threshold, by adding the thus obtained $f_s*NUM*T_{p(t)}$ samples of the sampled signal $s_s(n)$.

In a subsequent detection step, the proximity sensor 1 transmits a further NUM pulses by means of the transmission antenna 12. During this detection step, the proximity sensor 1 acquires a sampled signal $s_s(n)$ that is not only a function of the further NUM pulses transmitted, but also of the possible presence of a vehicle in the corresponding parking space.

The processing unit 22 consequently detects the possible presence of a vehicle within the parking space corresponding to the proximity sensor 1 on the basis of the calculated threshold and the $f_s*NUM*T_{p(t)}$ samples of the sampled signal $s_s(n)$ obtained during the detection step.

For example, the processing unit 22 can calculate the $f_s*NUM*T_{p(t)}$ absolute differences present between the first and the second samples, where first samples are intended as those samples acquired during the calibration step and second samples as those samples acquired during the detection step. In particular, the processing unit 22 subtracts, in absolute value, each second sample from the corresponding first sample.

Subsequently, the processing unit 22 can add the absolute differences, comparing the result of this addition with the previously calculated threshold and detecting the presence of a vehicle in the case where sum exceeds the threshold by more than a certain percentage of the threshold itself.

Alternatively, the processing unit 22 can calculate an average of the first samples and then calculate, for each first sample, a corresponding absolute deviation, equal to the absolute value of the difference between the first sample and the average. The processing unit 22 then calculates, for each first sample, a respective adaptive threshold, equal to the product of the respective absolute deviation and the respective weight. In addition, the processing unit 22 calculates the absolute differences between the first and the second samples, and then compares each absolute difference with the respective adaptive threshold. In the case where a certain number of absolute differences exceed the respective adaptive thresholds, the processing unit 22 detects the presence of a vehicle.

In practice, the proximity sensor 1 makes use of a radar technology of known type, yet does not need to implement computationally taxing spectrum analysis techniques, but rather detect the presence/absence of a vehicle on the basis of samples of a signal in the time domain, in this case the filtered signal $s_f(t)$.

Furthermore, after being inserted inside a suitable container, the proximity sensor 1 can be easily placed in proximity to the ground, as in fact described in patent application TO2009A000251. In particular, the container can be partially buried at a point in the ground that is substantially central with respect to the perimeter of the parking space corresponding to the proximity sensor 1.

The proximity sensor 1 therefore has the advantage that it can also be used, among other things, for monitoring open parking lots, devoid of overhead ceilings. However, the proximity sensor 1 enables detecting whether the corresponding parking space is occupied or not by a vehicle, but does not enable discriminating between different vehicles. Therefore, the proximity sensor 1 can be advantageously employed in applications where it is not necessary to distinguish between different vehicles that occupy the parking space.

On the other hand, in the case where it is wished to implement authorization policies for the occupation of parking spaces, utilization of the proximity sensor 1 may not be sufficient. In fact, such policies require checking that the parking spaces are occupied by effectively authorized vehicles. For example, a typical situation in which an authorization policy is implemented is where it wished to allow use of a parking space only for authorized vehicles, such as police vehicles, ambulances or the vehicles of disabled drivers for example. In this situation, it becomes necessary to discriminate between three different occupation states of the parking space: free, occupied by an authorized vehicle and occupied by an unauthorized vehicle; conversely, the proximity sensor 1 is only able to discriminate between two different occupation states: free and occupied.

Patent FR2917214 describes a survey system on the utilization of parking spaces, which comprises a plurality of sensors buried in the ground, a centralized receiver, a remote receiver, a central processing unit connected to the remote receiver and a plurality of onboard devices, installed on corresponding vehicles. Each sensor is associated with a corresponding parking space and comprises a detection device for the occupation state of this corresponding parking space, formed, in particular, by a magnetic transducer; in addition, each sensor comprises a transmission device, through which it can communicate its own ID and information regarding the occupation state of the corresponding parking space to the centralized receiver, which in turn forwards this information to the remote receiver, and hence to the central processing unit. In greater detail, the transmission device of each sensor can be chosen from a Zigbee, GPRS, Wifi, WiMAX, UMTS or EDGE device.

In practice, the system described in patent FR2917214 envisages that each sensor buried in the ground is equipped with a magnetic transducer and a transmission device, with a consequent increase in the complexity of the system.

Patent application EP1672386 describes the use of an FMCW radar both for detecting the distance and for transmitting data. In particular, according to patent application EP1672386, the signal emitted by the FMCW radar is frequency modulated when the FMCW radar is used to detect the distance, while it is modulated in amplitude, and in particular according to so-called on-off keying modulation, when the FMCW radar transmits data. Similarly, patent application US2007/096885 and the article "FMCW radar with broadband communication capability", by Peli Barrenechea et al., RADAR CONFERENCE, Jan. 10, 2007, EURAD 2007, pp. 130-133, describe systems in which an FMCW radar is used to transmit data; to this end, the FMCW radar is modulated according to so-called amplitude shift keying (ASK) modulation and amplitude modulation respectively.

Although amplitude modulation (whether of the analog or digital type) of an FMCW radar effectively enables an FMCW radar to be used to transmit bits, every time there is a transition between a '0' bit and a '1' bit, or vice versa, it entails waiting a sufficiently long period of time, typically of the order of milliseconds, before being able to effectively transmit. In fact, when being switched on, every FMCW radar is characterized by a transient of non-negligible duration, during which the frequency and amplitude of the electromagnetic wave it emits undergo unpredictable variations/fluctuations with respect to the frequency and amplitude expected when operating regularly. The described systems are thus characterized by not particularly high bit rates and therefore high consumption.

SUMMARY OF THE INVENTION

The object of the present invention is to provide a method and a system for determining the occupation state of a parking space that at least partially resolves the drawbacks of the known art.

According to the invention, a method and a system are provided for determining the occupation state of a parking space, as well as an electronic device, as respectively defined in the appended claims.

BRIEF DESCRIPTION OF THE DRAWINGS

For a better understanding of the invention, some embodiments will now be described, purely by way of a non-limitative example and with reference to the attached drawings, where:

FIGS. 5a, 7a, 10a and 11a show simplified block diagrams of systems for determining the occupation states of parking spaces;
FIGS. 5b, 7b, 10b, 11b and 12 show flowcharts of operations according to the present method.

DETAILED DESCRIPTION OF THE INVENTION

Figure 1:
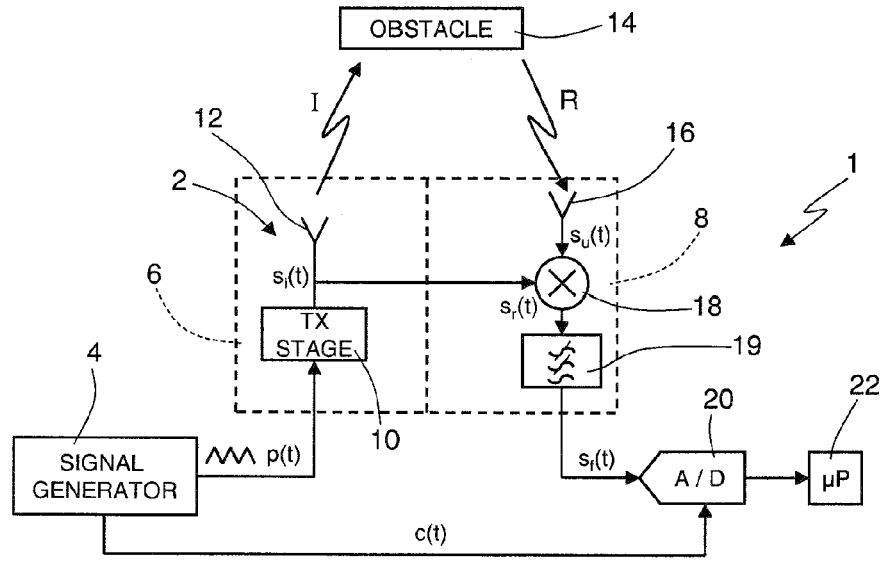
FIG. 1 shows a block diagram of a proximity sensor.
Figure 2:
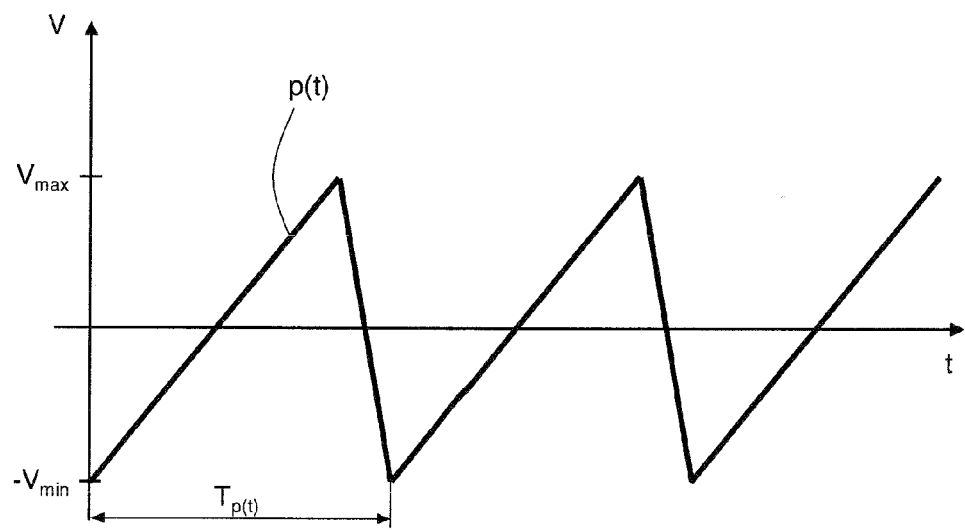
FIG. 2 shows a waveform of a pilot signal.
Figure 3:
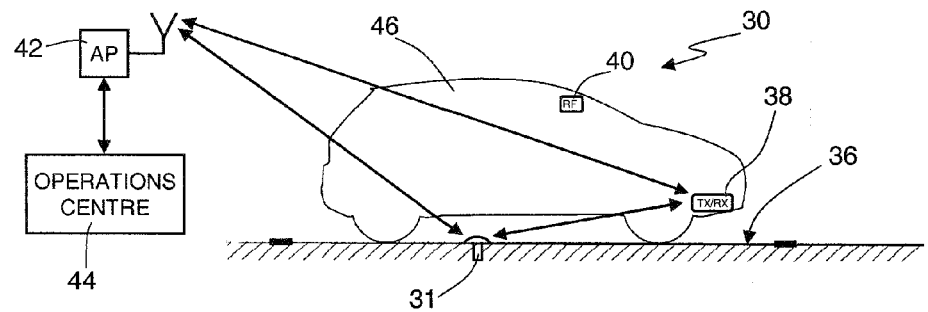
FIG. 3 schematically shows a system for determining the occupation state of a parking space.

FIG. 3 shows a system for determining the occupation state of a parking space, hereinafter referred to as the determination system 30 for brevity.

Figure 4:
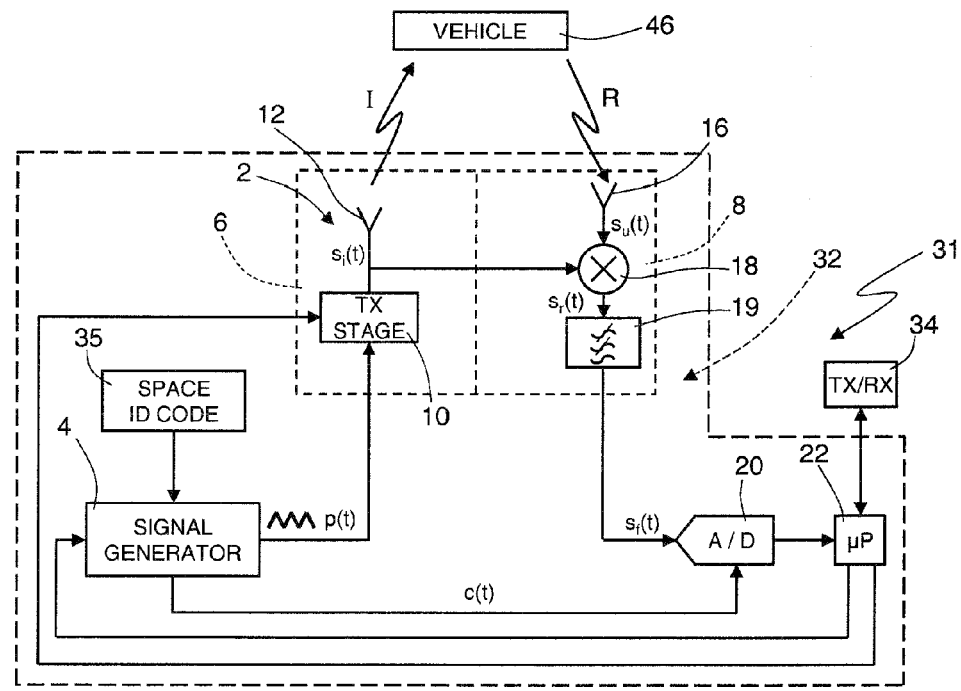
FIGS. 4 and 8 show simplified block diagrams of sensor units.

In detail, the determination system 30 comprises a ground unit 31, which in turn comprises a ground sensor 32 and a ground transponder 34, shown in FIG. 4. In FIG. 4, components of the ground sensor 32 already present in the previously described proximity sensor 1 are indicated in the same manner, the present description being limited to just the differences between the ground sensor 32 and the previously described proximity sensor 1.

The ground sensor 32 comprises a memory 35, connected to a first input of the signal generator 4 and containing a respective space identification code, hereinafter referred to as the space ID code. Basically, the ground sensor 32 is associated with a corresponding parking space 36 so that, as described in the following, the determination system 30 can enable detection of the occupation state of the parking space 36. The space ID code is a code that identifies the parking space 36.

Furthermore, with respect to the proximity sensor 1, the processing unit 22 of the ground sensor 32 is connected to the ground transponder 34, which is able to communicate, for example, in a band centered around 868 MHz.

In addition, the processing unit 22 of the ground sensor 32 is able to process the samples of the sampled signal $s_s(n)$ not only as previously described in connection with the proximity sensor 1, but also as described in the following.

The processing unit 22 of the ground sensor 32 is also connected to a second input of the signal generator 4 and to a second input of the transmission stage 10. In consequence, the processing unit 22 can control the signal generator 4 and the transmission stage 10 in order to modify the pilot signal $p(t)$ and the transmission signal $s_i(t)$, as described in the following.

Again with reference to FIG. 3, the determination system 30 further comprises an onboard unit 38, an onboard radio-communication module 40, an access point 42 and an operations center 44.

In detail, hereinafter it is assumed that the onboard unit 38 is constrained to a vehicle 46. Furthermore, the onboard radio-communication module 40 is also constrained to the vehicle 46, being arranged, for example, in the interior of the vehicle 46.

The access point 42 is instead placed so that it can communicate wirelessly with the ground transponder 34 of the ground unit 31 and with the onboard unit 38 of the vehicle 46 (if present). Thus, the access point 42 can communicate on a band centered, for example, around 868 MHz. In addition, the access point 42 is connected, possibly in a wired manner, to the operations center 44.

Figure 7A:
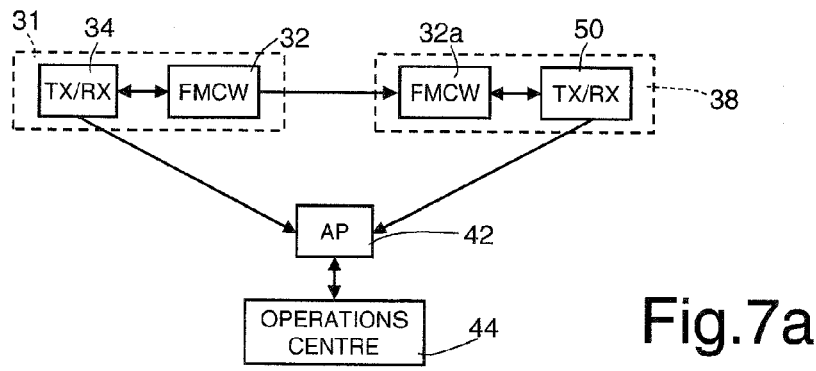

In greater detail, the onboard unit 38 may alternatively comprise a wide band receiver 39 (FIG. 5a), or an onboard sensor 32a the same as the ground sensor 32 (FIGS. 7a, 10a and 11a).

Figure 5A:
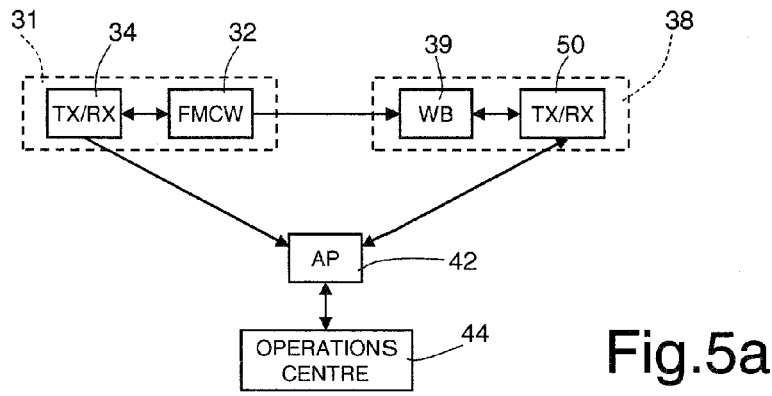

In particular, in the example shown in FIG. 5a, the onboard unit 38 comprises the wide band receiver 39 and an onboard transponder 50, connected to the wide band receiver 39 and able to communicate in a band centered, for example, around 868 MHz. Basically, by employing a radio protocol which is in itself known, the onboard transponder 50 can communicate with the access point 42, and therefore with the operations center 44, as well as with the onboard radio-communication module 40.

Figure 5B:
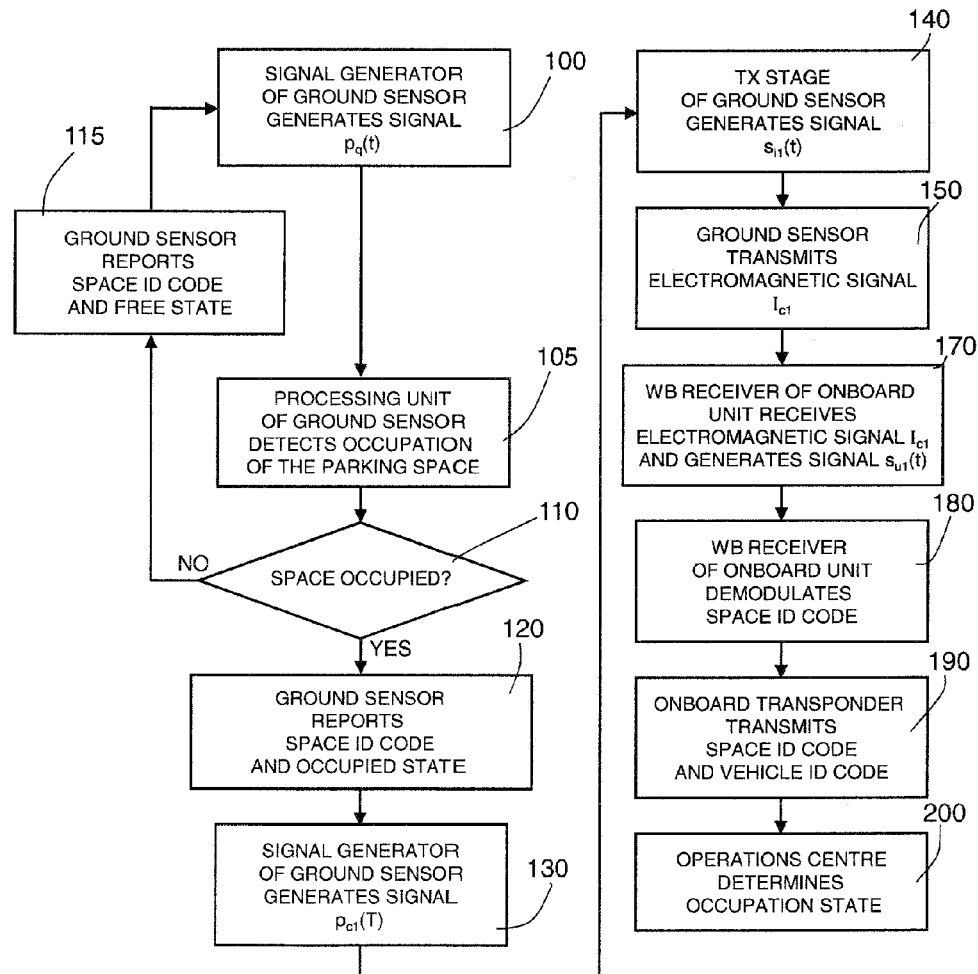

In detail, given the embodiment of the determination system 30 illustrated in FIG. 5a, upon a vehicle ID code being reported to the onboard transponder 50, it is possible to perform the operations shown in FIG. 5b to determine the occupation state of the parking space 36.

Purely by way of example, the reporting of the vehicle ID code can take place via the onboard radio-communication module 40. For example, the onboard radio-communication module 40 can be adapted to read an electronic card, such as a so-called smartcard for example, in a user's possession and containing a certain user ID code. The onboard radio-communication module can then transmit the user ID code contained in the electronic card to the onboard transponder 50, which stores a vehicle ID code equal to the user ID code. In this way, the vehicle ID code depends on the user ID code and the check on vehicle authorization is in practice a check on user authorization. In any event, different embodiments are possible, in which, for example, the vehicle ID code is preset in the onboard transponder 50 and is therefore a characteristic of the vehicle itself, instead of the users of the vehicle.

That having been said, during a waiting step, the ground sensor 32 detects, periodically for example, the occupation state of the parking space 36, until an occupied state is detected.

In particular, each detection entails the processing unit 22 controlling the signal generator 4 so that it generates (block 100) a query pilot signal $p_q(t)$ formed by a first pulse train, i.e. formed, for example, by a number $N_q$ of sawteeth and having the same frequency as a query frequency $f_q$, equal to 10 kHz for example. Furthermore, each detection entails the processing unit 22 processing a corresponding sampled query signal $s_{sq}(n)$ in order to detect (block 105), in a manner which is in itself known, whether the parking space 36 is alternatively free or occupied. In particular, the corresponding sampled query signal $s_{sq}(n)$ is obtained by the A/D converter 20 sampling a filtered query signal $s_{fq}(t)$ supplied by the low pass filter 19 and dependent on a query transmission signal $s_{iq}(t)$. In particular, the query transmission signal $s_{iq}(t)$ is supplied by the transmission stage 10 and is frequency modulated on the basis of the query pilot signal $p_q(t)$.

In practice, the operations indicated in blocks 100-105 enable the processing unit 22 to check if the occupation state of the parking space 36 is free or occupied.

In the case where the occupation state of the parking space 36 is free (NO exit from block 110), the processing unit 22 reports (block 115) the space ID code and "free" state to the operations center 44 and then repeats the operations indicated in block 100, for example, after waiting for a wait period of two seconds.

Otherwise, in the case where the occupation state of the parking space 36 is occupied (YES exit from block 110), the ground sensor 32 reports (block 120) the space ID code and the "occupied" state to the operations center 44. Subsequently, the processing unit 22 controls the signal generator 4 so that it generates (block 130) a first communication pilot signal (t), obtained by modulating with the space ID code a second pulse train, formed by a number $N_{c1}$ of sawteeth and having the same frequency as a first communication frequency $f_{c1}$, equal to 10 kHz for example.

In other words, indicating a generic sawtooth signal having a frequency equal to $f_{c1}$ as $saw1(t)$ and assuming that the space ID code is formed by a string STR_BIT_1 of bits including a number NUM_BIT_1 of bits, the first communication pilot signal $p_{c1}(t)$ is given by:

$$p_{c1}(t) = saw1(t) * code1(t) \text{ for } 0 < t < N_{c1}*(1/f_{c1})$$

where:

$$code1(t) = rect_1(t - iT_{code1}) * STR\_BIT\_1(i),$$
$$\text{for } i = 0, \ldots, NUM\_BIT\_1 - 1$$

where $T_{code1}$ is the inverse of a first code frequency $f_{code1}$, and $rect_1(t)$ is a gate function that yields one in the time interval $[0 - T_{code1}]$ and zero elsewhere. In practice, $code1(t)$ is null outside of the time interval $0 < t < NUM\_BIT\_1 * T_{code1}$ and $NUM\_BIT\_1 * T_{code1} = N_{c1} * (1/f_{c1})$. In a manner which is in itself known, the string STR_BIT_1 may contain a preamble that facilitates identification of the start of the same string STR_BIT_1 and/or an end-of-string identifier.

Figure 6:
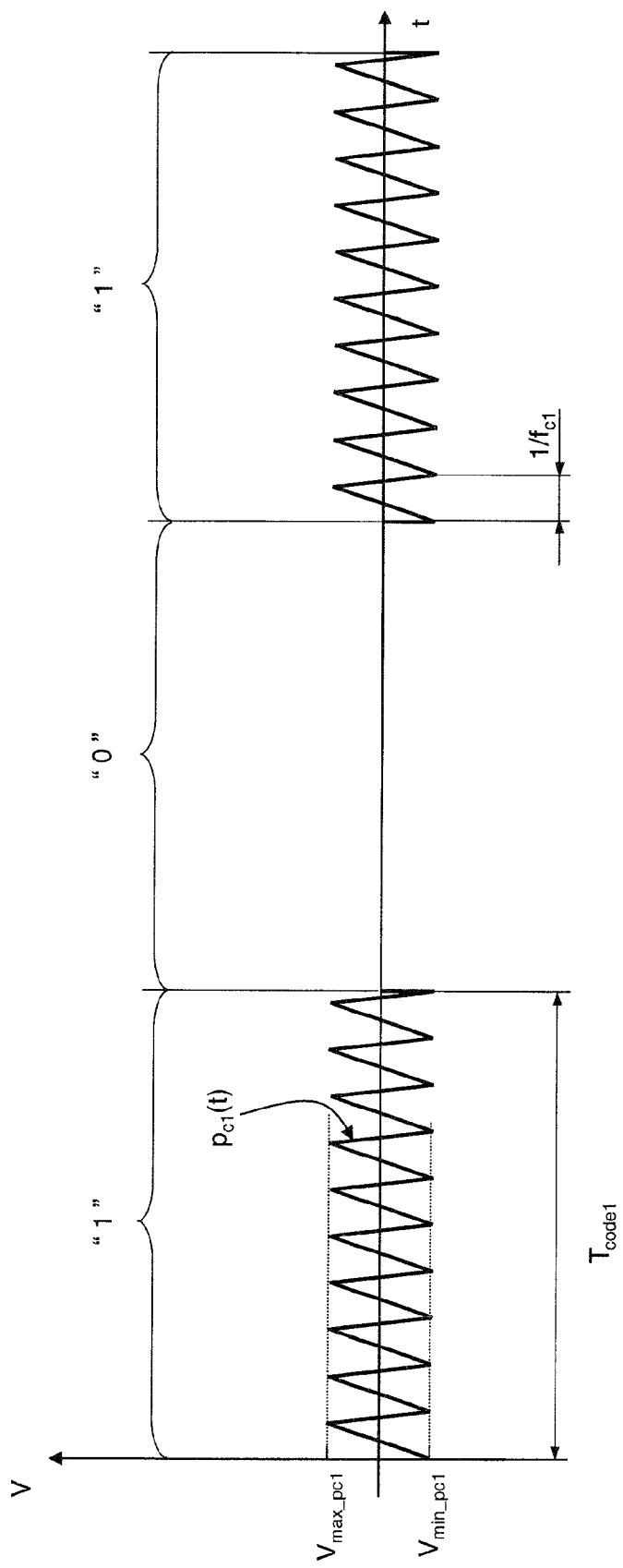
FIGS. 6, 9 and 13 shows waveforms of signals according to the present method.

A possible example of the first communication pilot signal $p_{c1}(t)$ is shown in FIG. 6. In particular, in this example, NUM_BIT_1=3, $f_{code1} = f_{c1}/10$ and string STR_BIT_1="101". The first communication pilot signal $p_{c1}(t)$ is comprised between a maximum value $V_{max\_pc1}$ and a minimum value $V_{min\_pc1}$. Furthermore, the processing unit 22 turns off the transmission stage 10 in correspondence to the time interval in which $code1(t)$ is null, i.e. in correspondence to the time interval in which the first communication pilot signal $p_{c1}(t)$ is modulated with a "0" bit. The transmission stage 10 thus generates (block 140) a first transmission signal $s_{i1}(t)$ that is null in the time instants when $code1(t)$ is null, i.e. during the time intervals in which the first communication pilot signal $p_{c1}(t)$ is modulated with a "0" bit. Conversely, in the time instants when $code1(t)$ is not null, i.e. in correspondence to the time intervals in which the first communication pilot signal $p_{c1}(t)$ is modulated with a "1" bit, the first transmission signal $s_{i1}(t)$ has an instantaneous frequency that is proportional to the same first communication pilot signal (t). Consequently, the transmission antenna 12 of the ground sensor 32 transmits (block 150) a first electromagnetic communication signal Ic1.

In detail, in the time instants when $code1(t)$ is not null, i.e. in correspondence to the time intervals in which the first communication pilot signal $p_{c1}(t)$ is modulated with a "1" bit, the transmission antenna 12 transmits an electromagnetic wave the instantaneous frequency of which is the same as the instantaneous frequency of the first transmission signal $s_{i1}(t)$, and is therefore a function of the first communication pilot signal (t). Instead, in the time instants when $code1(t)$ is null, i.e. in correspondence to the time intervals in which the first communication pilot signal $p_{c1}(t)$ is modulated with a "0" bit, the transmission antenna 12 does not transmits any signal.

The first electromagnetic communication signal $I_{c1}$ is therefore frequency modulated on the basis of the space ID code.

Since the parking space 36 is occupied, the onboard unit 38, and in particular the wide band receiver 39, receives (block 170) the first electromagnetic communication signal $I_{c1}$ and possibly also a first electromagnetic signal reflected by the vehicle 46. For example, the first electromagnetic communication signal $I_{c1}$ can be received by the wide band receiver 39 by means of a respective antenna (not shown), with consequent generation of a first acquired signal $s_{u1}(t)$ inside the same wide band receiver 39.

In addition, the wide band receiver 39 demodulates (block 180) the space ID code, i.e. it extracts $code1(t)$. Demodulation may take place in a manner which is in itself known, on the basis of the amplitude (null or non-null) of the first acquired signal $s_{u1}(t)$. The wide band receiver 39 then supplies the space ID code to the onboard transponder 50.

Subsequently, the onboard transponder 50 transmits (block 190) the space ID code and the vehicle ID code to the access point 42 and hence to the operations center 44.

The operations center 44 can then determine (block 200) the occupation state of the parking space 36, for example, by comparing the vehicle ID code with a list of authorized codes associated with the space ID code. In the case where the vehicle ID code belongs to the list of authorized codes, the occupation state is "occupied by an authorized vehicle", otherwise the occupation state is "occupied by an unauthorized vehicle". Furthermore, the operation indicated in block 120 enables detection of illicit occupation of the parking space 36 by a vehicle not equipped with the onboard unit 38. In this case, in fact, the operations center 44 detects occupation of the parking space, but does not receive any vehicle ID code.

Figure 8:
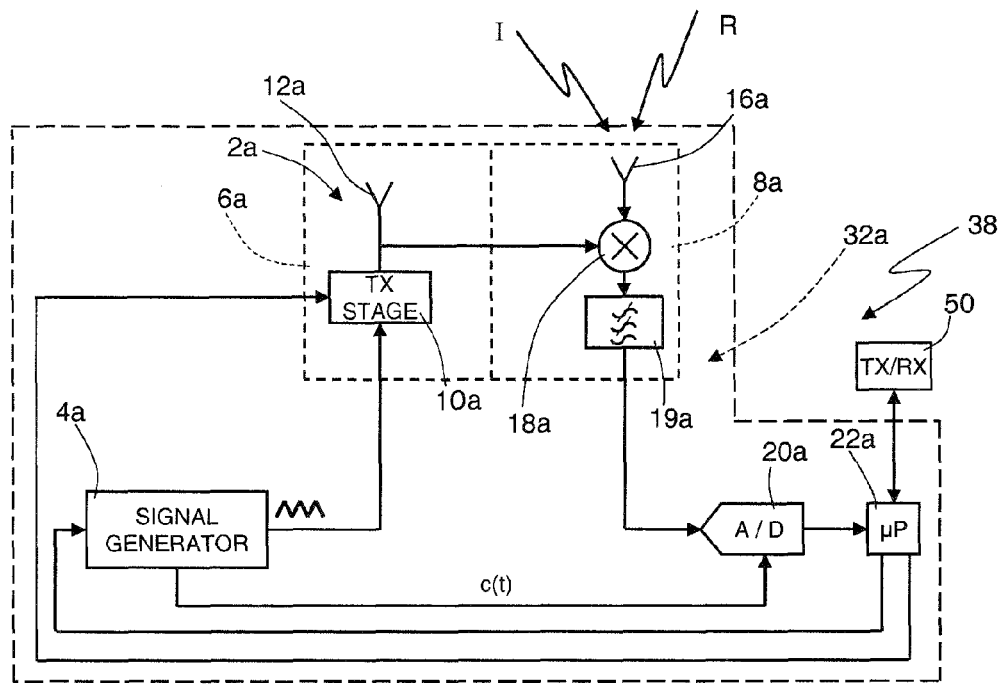

In a different embodiment, illustrated in FIG. 7a, in addition to the onboard transponder 50, the onboard unit 38 comprises the onboard sensor 32a, which is connected to the onboard transponder 50. Details of the onboard unit 38, and in particular of the onboard sensor 32a, are shown in FIG. 8, in which components of the onboard sensor 32a already present in the ground sensor 32 are indicated with the same reference numbers, followed by the letter "a". In addition, as again shown in FIG. 8, the onboard transponder 50 is connected to the processing unit 22a of the onboard sensor 32a.

Figure 7B:
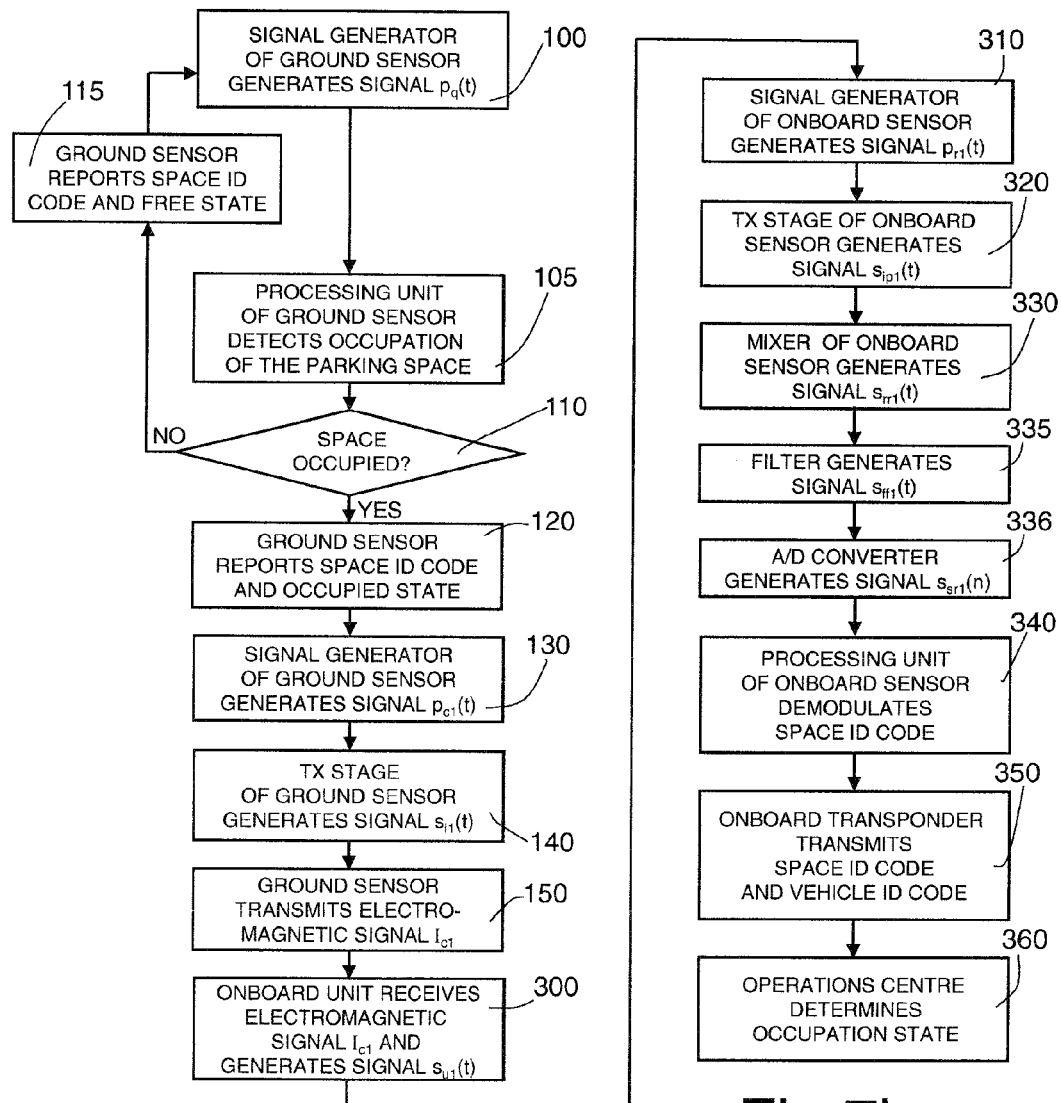

In this case, it is possible to perform the operations shown in FIG. 7b to determine the occupation state of the parking space 36.

In detail, subsequent to the already described operations indicated in blocks 100-150, the onboard unit 38, and in particular the onboard sensor 32a, receives (block 300) the first electromagnetic communication signal $I_{c1}$.

In greater detail, the onboard sensor 32a receives the first electromagnetic communication signal $I_{c1}$ (and possibly also the first reflected electromagnetic signal R, coming from the vehicle 36) by means of its own receiving antenna 16a, generating the first acquired signal $s_{u1}(t)$.

Furthermore, the signal generator 4a of the onboard sensor 32a is controlled by the processing unit 22a so as to generate (block 310) a first reception pilot signal $p_{r1}(t)$ having a sawtooth waveform and the same frequency as a first reception frequency $f_{r1}$, equal to 1 kHz for example. In practice, the first reception pilot signal $p_{r1}(t)$ is not modulated with any code, and moreover the processing unit 22a does not turn off the transmission stage 10a, so that the transmission stage 10a generates (block 320) a first continuous-time pseudo-transmission signal $s_{ip1}(t)$. The first reception pilot signal $p_{r1}(t)$ is comprised between a maximum value $V_{max\_pr1}$ and a minimum value $V_{min\_pr1}$.

It should also be noted that in FIG. 7b, although blocks 310-320 are shown, for simplicity, as being successive to blocks 100-150, the associated operations can be considered chronologically independent with respect to operations indicated in blocks 100-150.

The mixer 18a of the onboard sensor 32a then generates (block 330) a first mixed reception signal $s_{rr1}(t)$, equal to $s_{u1}(t) * s_{ip1}(t)$. In turn, the low pass filter 19a generates (block 335) a first filtered reception signal $s_{fr1}(t)$.

Figure 9:
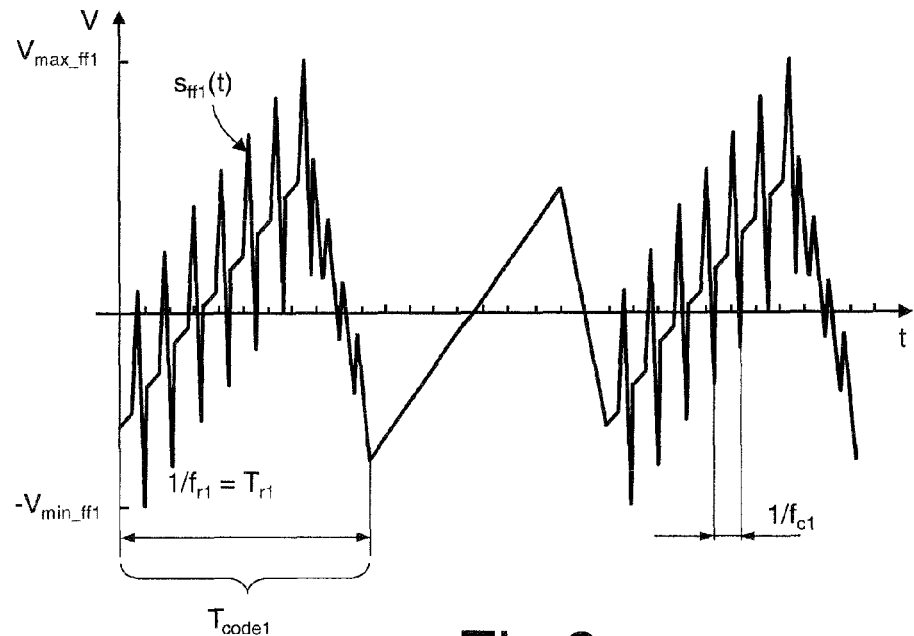

An example of the first filtered reception signal $s_{fr1}(t)$ is shown in FIG. 9. In particular, the example shown in FIG. 9 is related to the example shown in FIG. 6, therefore with $T_{code1}=1/f_{r1}$, and with the simplified assumption that the propagation times of the electromagnetic waves between the ground unit 31 and the onboard unit 38 are negligible in a first approximation. In addition, it is assumed that $V_{max\_pc1}=V_{max\_pr1}$ and $V_{min\_pc1}=V_{min\_pr1}$.

With reference, by way of example, to the case where the first communication frequency $f_{01}$ and the first reception frequency $f_{r1}$ are equal to 10 kHz and 1 kHz respectively, it is possible to experimentally verify that the first filtered reception signal $s_{fr1}(t)$ can be divided into first and second portions, respectively extending in first and second time intervals, substantially synchronous with respect to the signal code1($t$).

In detail, each of the first and the second time intervals has a duration equal to $T_{code1}$. Furthermore, the first time intervals correspond to bits equal to "1" in string STR_BIT_1, while the second time intervals correspond to "0" bits in the STR_BIT_1 bit string. In greater detail, each first portion of the first filtered reception signal $s_{fr1}(t)$ exhibits, on the simplified assumption whereby the first reception pilot signal $p_{r1}(t)$ is temporally aligned with code1($t$), a sawtooth with a duration equal to $1/f_{r1}$, on which a plurality of peaks are superimposed, ten peaks in this case, temporally spaced apart by $1/f_{c1}$. Vice versa, each second portion of the first filtered reception signal $s_{fr1}(t)$ exhibits, again on the simplified assumption whereby the first reception pilot signal $p_{r1}(t)$ is temporally aligned with code1($t$), a sawtooth with a duration equal to $1/f_{r1}$, devoid of additional superimposed peaks.

In practice, the peaks are due to the beats that are created between the first pseudo-transmission signal $s_{ip1}(t)$ and the first acquired signal $s_{u1}(t)$. In particular, the peaks occur in time instants in which the first pseudo-transmission signal $s_{ip1}(t)$ and the first acquired signal $s_{u1}(t)$, which are modulated in frequency with different modulation periods, have the same frequency.

More specifically, the peaks are formed as it has been assumed that the onboard sensor 32a and the ground sensor 32 are the same, as well as that $V_{max\_pc1}=V_{max\_pr1}$ and $V_{min\_pc1}=V_{min\_pr1}$. Consequently, indicating the minimum frequency and the maximum frequency of the first electromagnetic communication signal $I_{c1}$ (and therefore of the first acquired signal $s_{u1}(t)$) as $f_{min\_Ic1}$ and $f_{max\_Ic1}$ respectively, and indicating the minimum and the maximum frequency of the first pseudo-transmission signal $s_{ip1}(t)$ as $f_{min\_sip1}$ and $f_{max\_sip1}$ respectively, gives $f_{min\_Ic1}=f_{min\_sip1}$ and $f_{max\_Ic1}=f_{max\_sip1}$.

In general, however, it is not necessary for the frequency sweep [$f_{min\_Ic1}, f_{max\_Ic1}$] of the first electromagnetic communication signal $I_{c1}$ and the frequency sweep [$f_{min\_sip1}, f_{max\_sip1}$] of the first pseudo-transmission signal $s_{ip1}(t)$ to be identical; in fact, it is sufficient for them to be just partially superimposed. Having assumed that the onboard sensor 32a and the ground sensor 32 are the same, it is therefore sufficient that the intervals [$V_{min\_pc1}, V_{max\_pc1}$] and [$V_{min\_pr1}, V_{max\_pr1}$] are at least partially overlapping.

Upon sampling the first filtered reception signal $s_{fr1}(t)$, the A/D converter 20a of the onboard sensor 32a generates (block 336) a first sampled reception signal $s_{sr1}(n)$. The processing unit 22a of the onboard sensor 32a can then demodulate (block 340) the space ID code, on the basis of the first sampled reception signal $s_{sr1}(n)$. In particular, the processing unit 22a decodes a "1" bit when it detects the presence of one of the above-mentioned first portions, while it decodes a bit "0" when it detects of the above-mentioned second portions.

In other words, the processing unit 22a determines the bits of the bit string STR_BIT_1 on the basis of the presence/absence of peaks at the first communication frequency $f_{c1}$. For example, to detect the presence/absence of peaks, it is possible to resort to known techniques of spectrum analysis, or, preferably, to the instructions contained in patent application TO2009A000251.

The vehicle ID code is then supplied by the processing unit 22a of the onboard sensor 32a to the onboard transponder 50, which transmits (block 350) it, together with the vehicle ID code, to the access point 42 and hence to the operations center 44, which determines (block 360) the occupation state of the parking space 36, as previously described. In practice, the operations indicated in blocks 350 and 360 are respectively the same as the operations indicated in blocks 190 and 200.

In yet another different embodiment, illustrated in FIG. 10a, the onboard unit 38 is of the type shown in FIG. 7a, and therefore comprises the onboard sensor 32a. Furthermore, according to this embodiment, it is possible to perform the operations shown in FIG. 10b to determine the occupation state of the parking space 36.

In detail, the ground sensor 32 performs the operations indicated in blocks 100-120, i.e. periodically determines whether the parking space 36 is free or occupied, informing the operations center 44 accordingly.

After having performed the operation indicated in block 120, the processing unit 22 of the ground sensor 32 controls the signal generator 4 so that it generates (block 400) a second reception pilot signal $p_{r2}(t)$, for example, equal to the first reception pilot signal $p_{r1}(t)$ and therefore not modulated with any code. In addition, the processing unit 22 does not turn off the transmission stage 10, so that the transmission stage generates (block 410) a second continuous-time pseudo-transmission signal $s_{ip2}(t)$.

The processing unit 22a of the onboard sensor 32a instead controls the signal generator 4a so that it generates (block 420) a second communication pilot signal $p_{c2}(t)$, obtained by modulating with the vehicle ID code a third pulse train, formed by a number $N_{c2}$ of sawteeth and having the same frequency as a second communication frequency $f_{c2}$, equal to 10 kHz for example. In other words, indicating a generic sawtooth signal having a frequency equal to $f_{c2}$ as saw2(t), and assuming that the vehicle ID code is formed by a bit string STR_BIT_2 including a number NUM_BIT_2 of bits, the second communication pilot signal $p_{c2}(t)$ is given by:

$$p_{c2}(t) = saw2(t) * code2(t) \text{ for } 0 < t < N_{c2}*(1/f_{c2})$$

where:

$$code2(t) = rect_2(t - iT_{code2}) * STR\_BIT\_2(i),$$
$$\text{for } i = 1, \ldots, NUM\_BIT\_2$$

where $T_{code2}$ is the inverse of a second code frequency $f_{code2}$, and $rect_2(t)$ is a gate function that yields one in the time interval $[0-T_{code2}]$ and zero elsewhere. In practice, code2(t) is null outside of the time interval $0 < t < NUM\_BIT\_2*T*_{code2}$ and $NUM\_BIT\_2*T_{code2} = N_{c2}*(1/f_{c2})$. In a manner which is in itself known, the string STR_BIT_2 may contain a preamble that facilitates identification of the start of the same string STR_BIT_2, and/or an end-of-string identifier.

In addition, the processing unit 22a turns off the transmission stage 10a in correspondence to the time intervals in which code2(t) is null, i.e. in correspondence to the time intervals in which the second communication pilot signal $p_{c2}(t)$ is modulated with a "0" bit. The transmission stage 10a thus generates (block 430) a second transmission signal $s_{i2}(t)$ that is null in the time instants when code2(t) is null, i.e. during the time intervals in which the second communication pilot signal $p_{c2}(t)$ is modulated with a "0" bit. Conversely, in the time instants when code2(t) is not null, i.e. in correspondence to the time intervals in which the second communication pilot signal $p_{c2}(t)$ is modulated with a "1" bit, the second transmission signal $s_{i2}(t)$ has an instantaneous frequency that is proportional to the same second communication pilot signal $p_{c2}(t)$.

In consequence, the transmission antenna 12a of the onboard sensor 32a transmits (block 440) a second electromagnetic communication signal $I_{c2}$, the instantaneous frequency of which is the same as the instantaneous frequency of the second transmission signal $s_{i2}(t)$, and is therefore a function of the second communication pilot signal $p_{c2}(t)$. The second electromagnetic communication signal $I_{c2}$ is therefore frequency modulated on the basis of the vehicle ID code.

Since the parking space 36 is occupied, the ground unit 31, and in particular the ground sensor 32, receives (block 450) the second electromagnetic communication signal $I_{c2}$ by means of the receiving antenna 16, generating a second acquired signal $s_{u2}(t)$.

The mixer 18 of the ground sensor 32 then generates (block 460) a second mixed reception signal $s_{rr2}(t)$, equal to $s_{u2}(t)*s_{ip2}(t)$. In turn, the low pass filter 19 of the ground sensor 32 generates (block 465) a second filtered reception signal $s_{ff2}(t)$ by filtering the second mixed reception signal $s_{rr2}(t)$.

Upon sampling the second filtered reception signal $s_{ff2}(t)$, the A/D converter 20 of the ground sensor 32 generates (block 466) a second sampled reception signal $s_{sr2}(n)$.

In the same way as that described regarding the operations indicated in block 340, the processing unit 22 of the ground sensor 32 demodulates (block 470) the vehicle ID code on the basis of the second sampled reception signal $s_{sr2}(n)$ and subsequently supplies the vehicle ID code to the ground transponder 34, which transmits (block 480) it, together with the space ID code, to the access point 42 and hence to the operations center 44. Lastly, the operations center 44 determines (block 490) the occupation state of the parking space 36 as previously described; in practice, the operations indicated in block 490 are the same as the operations indicated in blocks 200 and 360.

In yet another different embodiment, illustrated in FIG. 11a, the onboard unit 38 is of the type shown in FIGS. 7a and 10a, and therefore comprises, as well as the onboard transponder 50, the onboard sensor 32a. In addition, the ground unit 31 comprises a ground receiver 60, connected to the ground sensor 32. In particular, the ground receiver 60 is connected to the processing unit 22 of the ground sensor 32. Moreover, in this embodiment, the ground sensor 32 is normally turned off and can be activated by the ground receiver 60, as described in the following.

With regard to this embodiment, it is possible to perform the operations shown in FIG. 11b to determine the occupation state of the parking space 36.

In detail, although not shown in FIG. 11b, the ground sensor 32 performs the operations indicated in blocks 100-120, i.e. it periodically determines whether the parking space 36 is free or occupied, informing the operations center 44 accordingly.

In addition, independently of the operations indicated in blocks 100-120, the processing unit 22a of the onboard sensor 32a controls the signal generator 4a so that it generates (block 420) the second communication pilot signal $p_{c2}(t)$, modulated with the vehicle ID code. Furthermore, unit 22a turns the transmission stage 10a on and off so that it generates (block 430) the second transmission signal $s_{i2}(t)$.

In consequence, the transmission antenna 12a of the onboard sensor 32a transmits (block 440) the second electromagnetic communication signal $I_{c2}$, which is received (block 500) by the ground receiver 60 of the ground unit 31, with consequent generation of the second acquired signal $s_{u2}(t)$ inside the same ground receiver 60.

Subsequently, the ground receiver 60 demodulates (block 510) the vehicle ID code, as previously described regarding the operations of block 180, carried out by the wide band receiver 39 to demodulate the space ID code. In addition, the ground receiver 60 activates (block 520) the ground sensor 32 and transmits (block 530) the vehicle ID code to the processing unit 22 of the ground sensor 32.

In turn, the ground sensor 32 performs the operations indicated in blocks 100-110 again, here indicated respectively as 540, 550 and 560. In practice, the operations indicated in blocks 540-560 enable the ground sensor 32, excluding errors, to confirm the effective occupation of the parking space 36, i.e. they lead to the YES exit from block 560. Should that not be the case, the NO exit is taken from block 560 and the ground sensor 32 sends (block 565) an error notification to the operations center 44.

Subsequently, the processing unit 22 of the ground sensor 32 supplies the vehicle ID code and the space ID code to the ground transponder 34, which transmits them (block 570) to the access point 42, and hence to the operations center 44. Lastly, the operations center 44 determines (block 580) the occupation state of the parking space 36, as previously described. In other words, the operations indicated in blocks 570 and 580 are the same as the respective operations indicated in blocks 480 and 490.

In practice, in this embodiment, the acquisition of the vehicle ID code by the ground unit 31 is triggered independently of the onboard unit 38, which causes the same ground unit 31 to be turned on as needed.

It should also be noted that, with regard to the operations indicated in blocks 200, 360, 490 and 580, when the parking space 36 is not occupied by any vehicle, the operations center periodically receives the space ID code and information regarding the fact that the parking space is free. Furthermore, after having possibly detected an "occupied by an authorized vehicle" state, or an "occupied by an unauthorized vehicle" state, the determination system 30 can repeat the operations shown in FIGS. 5a, 7a, 10a and 11a after having detected, in a manner which is in itself known, that the parking space 36 has been freed.

According to different embodiments, the first and second transmission signals $s_{i1}(t)$ and $s_{i2}(t)$, and consequently also the first and second electromagnetic communication signals $I_{c1}$ and $I_{c2}$, may be different with respect to that described. In fact, by way of example, the processing unit 22 can, in correspondence to the time intervals in which code1($t$) is null, control the signal generator 4 and transmission stage 10 so that the first electromagnetic communication signal $I_{c1}$ has a frequency such that it cannot be demodulated by the wide band receiver 39, or by the radar 2a of the onboard sensor 32a, according to the embodiment.

To this end, with reference to the embodiment shown in FIG. 5a for example, and assuming that the wide band receiver 39 has a certain reception band, it is possible to force the first electromagnetic communication signal $I_{c1}$ to have a frequency outside the reception band of the wide band receiver 39 during the time intervals in which code1($t$) is null.

Figure 12:
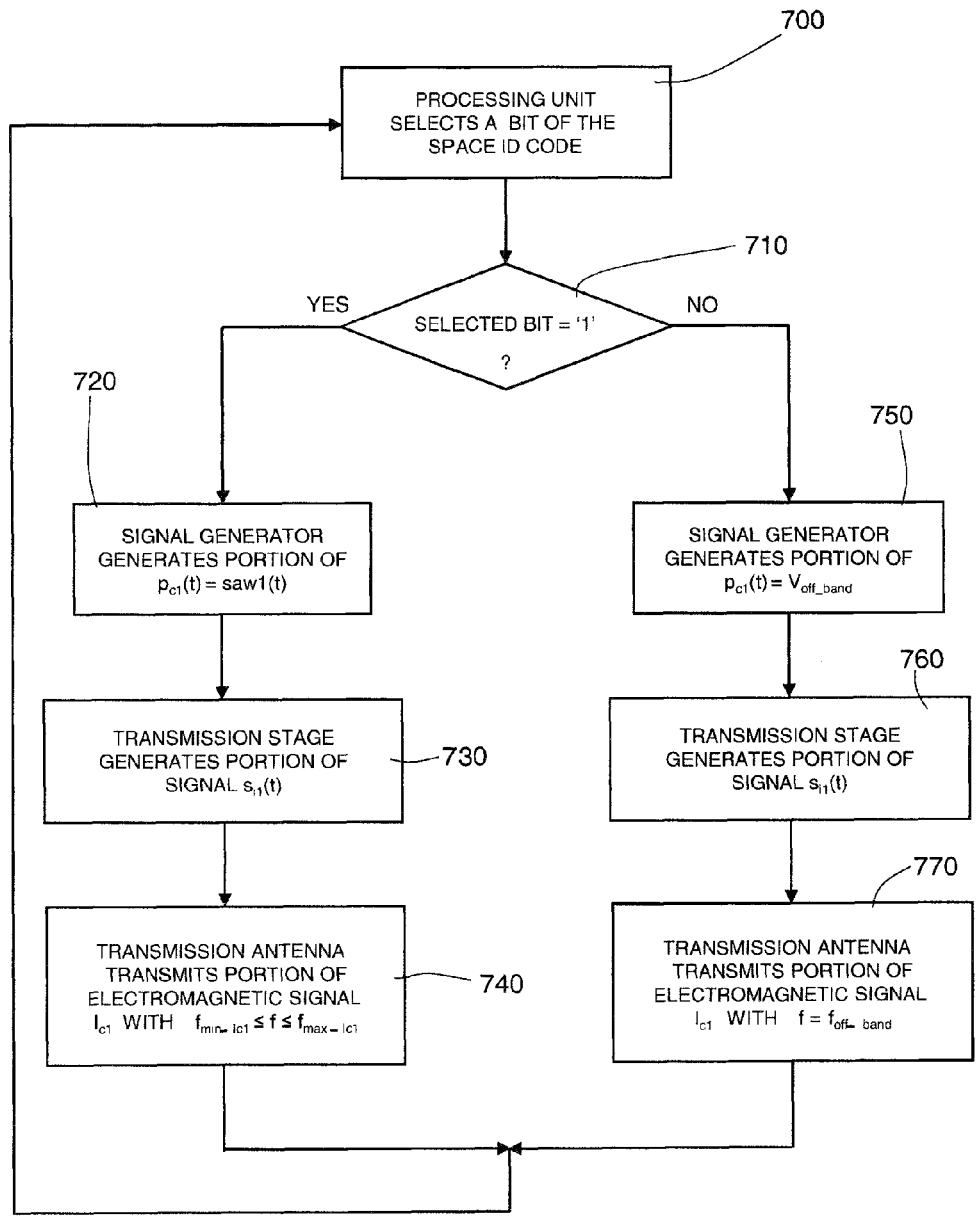

Always by way of example, and with reference to the embodiment shown in FIG. 7a, the ground sensor 32 may perform the operations shown in FIG. 12.

In detail, the processing unit 22 of the ground sensor 32 individually selects (block 700) each bit of the space ID code and determines (block 710) whether it is equal to '0' or '1'.

In the case where the selected bit is equal to '1' (YES exit from block 710), the processing unit 22 controls the signal generator 4 so that it generates (block 720) a corresponding portion of the first communication pilot signal $p_{c1}(t)$, which has a time duration equal to $T_{code1}$ and is equal to saw1($t$), and therefore is comprised between $V_{max\_pc1}$ and $V_{min\_pc1}$. The transmission stage 10 then generates (block 730) a corresponding portion of the first transmission signal $s_{i1}(t)$, on the basis of which the transmission antenna 12 transmits (block 740) a portion of the first electromagnetic communication signal $I_{c1}$, formed in this case by an electromagnetic wave the instantaneous frequency of which is a function of the first communication pilot signal $p_{c1}(t)$ and is comprised between $f_{min\_Ic1}$ and $f_{max\_Ic1}$ i.e. it is contained within a transmission band of the radar 2 of the ground sensor 32. Furthermore, $f_{min\_Ic1}=f_{min\_sip1}$ and $f_{max\_Ic1}=f_{max\_sip1}$, or, in any case, the frequency sweep $[f_{min\_Ic1}, f_{max\_Ic1}]$ of this portion of the first electromagnetic communication signal $I_{c1}$ at least partially overlaps the frequency sweep $[f_{min\_sip1}, f_{max\_sip1}]$ of the first pseudo-transmission signal $s_{ip1}(t)$.

Subsequently, the processing unit 22 repeats the operations indicated in block 700 until all the bits of the space ID code are processed.

In the case where the selected bit is equal to '0' (NO exit from block 710), the processing unit 22 controls the signal generator 4 so that it generates (block 750) a corresponding portion of the first communication pilot signal $p_{c1}(t)$, which still has a time duration equal to $T_{code1}$, but assumes a reference value $V_{off\_band}$, outside the range between $V_{max\_pc1}$ and $V_{min\_pc1}$.

The transmission stage 10 is not turned off during the time interval in which the first communication pilot signal $p_{c1}(t)$ is modulated with a "0" bit; on the contrary, it generates (block 760) a corresponding portion of the first transmission signal $s_{i1}(t)$, which has a constant frequency equal to $f_{off\_band}$. In addition, on the basis of this portion of the first transmission signal $s_{i1}(t)$, the transmission antenna 12 transmits (block 770) a corresponding portion of the first electromagnetic communication signal $I_{c1}$, formed by an electromagnetic wave having a frequency that is constant and equal to $f_{off\_band}$. Subsequently, the processing unit 22 repeats the operations indicated in block 700, until all the bits of the space ID code are processed.

In detail, the reference value $V_{off\_band}$ is such that the frequency $f_{off\_band}$ is not included in the frequency sweep $[f_{min\_sip1}, f_{max\_sip1}]$ of the first pseudo-transmission signal $s_{ip1}(t)$, which represents a kind of reception band for the radar 2a of the onboard sensor 32a, as it defines the frequency range to which the radar 2a can be tuned. In this way, it results that this portion of the first electromagnetic communication signal $I_{c1}$ has a frequency that falls outside the reception band of the radar 2a of the onboard sensor 32a and so cannot be demodulated by the radar 2a.

Figure 13:
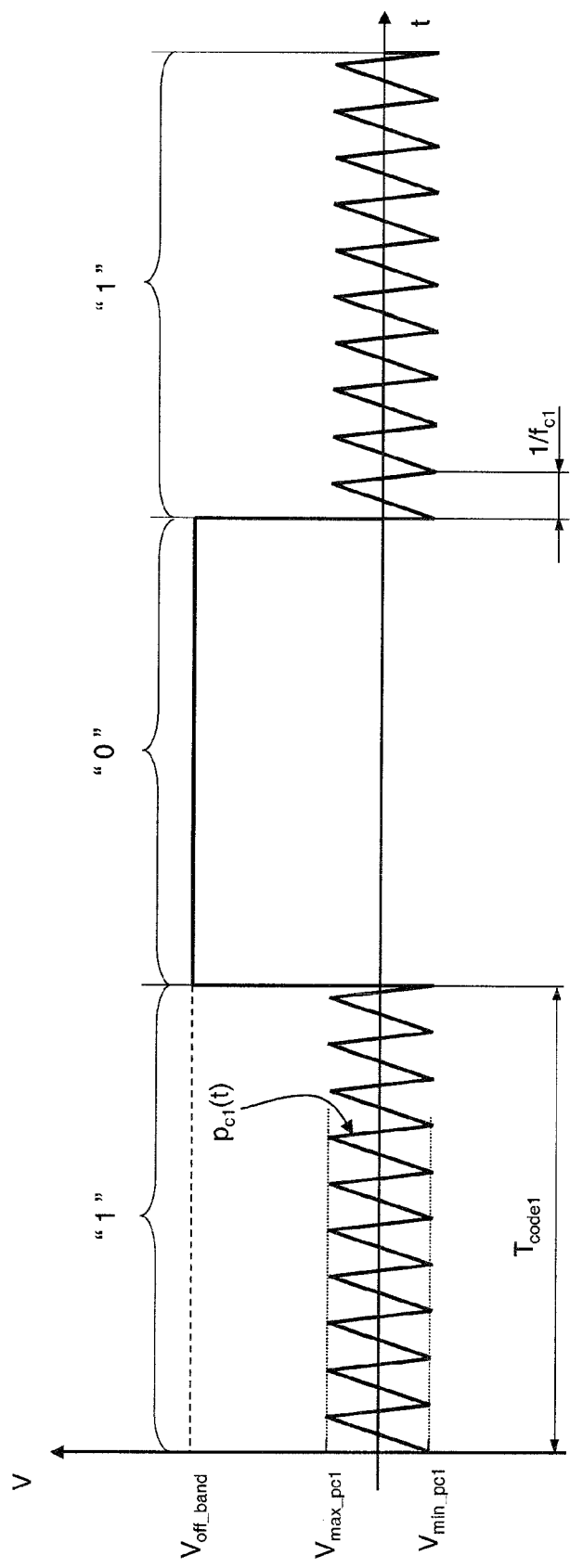

In practice, one example of the first communication pilot signal $p_{c1}(t)$ is of the type shown in FIG. 13, where there is still NUM_BIT_1=3, $f_{code1}=f_{c1}/10$, and string STR_BIT_1="101". In this example, it is assumed that $V_{off\_band}$ is greater than $V_{max\_pr1}$, so as to have $T_{off\_band}>f_{max\_sip1}$.

According to these embodiments, the first electromagnetic communication signal $I_{c1}(t)$ is no longer null in the time instants when code1($t$) is null, i.e. it is no longer modulated in amplitude on the basis of code1($t$). Thus, it is possible to increase the first code frequency $f_{code1}$, thanks to elimination of the transients due to the periods when the first electromagnetic communication signal $I_{c1}(t)$ is null. However, from the standpoint of the wide band receiver 39 and/or the onboard sensor 32a, it is as if the first electromagnetic communication signal $I_{c1}(t)$ was null during the above-mentioned time instants, because it has a frequency to which the radar 2a of the onboard sensor 32a cannot be tuned.

Similar considerations can be made with regard to the embodiments illustrated in FIGS. 10a and 11a, and in particular with regard to the second communication pilot signal $p_{c2}(t)$, the second transmission signal $s_{i2}(t)$ and the second electromagnetic communication signal $I_{c2}$. Therefore, it is possible that, in transmitting the vehicle ID code, the onboard sensor 32a transmits alternatively:

portions of the second electromagnetic communication signal $I_{c2}$ having a frequency proportional to the second communication pilot signal $p_{c2}(t)$ and contained within a frequency range $[f_{min\_Ic2}; f_{max\_Ic2}]$ at least partially overlapping the reception band of the ground receiver 60 or the reception band of the radar 2 of the ground sensor 32, the latter being defined by the frequency sweep $[f_{min\_sip2}, f_{max\_sip2}]$ of the second pseudo-transmission signal $s_{ip2}(t)$; or portions of the second electromagnetic communication signal $I_{c2}$ having a constant frequency $f_{off\_band}$ and outside the reception band of the ground receiver 60 or the radar 2 of the ground sensor 32.

It should also be noted that, with regard to the portions of the first and the second electromagnetic communication signals $I_{c1}$ and $I_{c2}$ transmitted in correspondence to null bits of the space ID code and the vehicle ID code, it is not necessary that the frequency is constant; in fact, it is sufficient that it is outside the reception band of the radar 2a of the onboard sensor 32a, of the radar 2 of the ground sensor 32, of the wide band receiver 39 or of the ground receiver 60, according to the embodiment.

The advantages that can be achieved with the present determination method and system clearly emerge from the foregoing discussion.

In particular, the present determination method and system enable the occupation state of a parking space to be determined, discriminating between "free", "occupied by an authorized vehicle" and "occupied by an unauthorized vehicle", without the need for resorting to additional detection systems, such as systems or devices based on the use of the so-called Radio Frequency Identification (RFID) technology for example. In fact, the space ID code and the vehicle ID code are transmitted from the ground unit and from the onboard unit, i.e. by radar. In particular, the transmission speed (bit rate) of these codes depends respectively on the first and the second code frequencies $f_{code1}$ and $f_{code2}$.

Furthermore, the present the present determination method and system enable consumption optimization of the ground sensor 32, which can be powered in a known manner, for example by means of a respective battery (not shown). In fact, it is possible to repeat the operations indicated in blocks 100-120 with large wait periods, as these operations are independent of the operations regarding the transmission of space/vehicle ID codes. Furthermore, when the radars of the ground sensor and the onboard sensor are not modulated in amplitude, it is possible to obtain particularly high bit rates and in consequence, for the same amount of information to be transmitted, it is possible to keep these radars turned on for shorter periods of time.

Finally, it is understood that changes and modifications may be made to the present determination method and system, without leaving the scope of without leaving the scope of the present invention.

For example, the query pilot signal $p_q(t)$, the first and the second communication pilot signal $p_{c1}(t)$, $p_{c2}(t)$, as well as the first and the second reception pilot signal $p_{r1}(t)$, $p_{r2}(t)$ can be formed by pulses having different shapes from sawteeth, such as pulses with a triangular shape for example, or an (increasing/decreasing) exponential shape.

In addition, some of the operations shown in FIGS. 5b, 7b, 10b, 11b and 12 can be absent and/or carried out in a different order with respect to that described.

The invention claimed is:

1. A method for determining the occupation state of a parking space, said occupation state being alternatively free, if said parking space is not occupied by any vehicle, legitimately occupied, if said parking space is occupied by an authorized vehicle, or illegitimately occupied, if said parking space is occupied by an unauthorized vehicle, said method comprising the steps of:
   providing a first detection unit comprising a radar of the frequency modulated continuous wave radar type;
   providing a decision unit and a second detection unit;
   transmitting a first communication signal by said radar, said first communication signal being modulated on the basis of a first identification code, alternatively indicating either said parking space or a vehicle;
   receiving said first communication signal by said second detection unit;
   demodulating said first identification code by said second detection unit starting from said first communication signal;
   transmitting said first identification code by said second detection unit to the decision unit; and
   determining said occupation state by said decision unit on the basis of said first identification code and a second identification code, alternatively indicating either the vehicle or said parking space.

2. The determination method according to claim 1, wherein said first communication signal is frequency modulated on the basis of said first identification code and of a periodic transmission signal.

3. The determination method according to claim 2, wherein said first communication signal is also amplitude modulated on the basis of said first identification code.

4. The determination method according to claim 2, wherein said periodic transmission signal has a transmission frequency, and wherein said step of demodulating said first identification code comprises, by said second detection unit:
   generating an acquired signal, on the basis of said first communication signal;
   generating a listening signal which is frequency-modulated on the basis of a periodic reception signal, said periodic reception signal having a reception frequency different from said transmission frequency;
   multiplying said acquired signal by said listening signal, generating a mixed signal;
   filtering said mixed signal, generating a filtered signal; and
   detecting, within said filtered signal, the presence/absence of peaks spaced by the transmission frequency.

5. The determination method according to claim 1, further comprising the steps of:
   acquiring said second identification code by said second detection unit; and
   transmitting said second identification code by said second detection unit to the decision unit.

6. The determination method according to claim 1, wherein said step of providing a first detection unit comprises fixing said first detection unit with respect to said parking space, and wherein said step of providing a second detection unit comprises fixing said second detection unit to a first vehicle, said first identification code identifying said parking space and said second identification code identifying said first vehicle.

7. The determination method according to claim 1, wherein said step of providing a first detection unit comprises fixing said first detection unit to a first vehicle, and wherein said step of providing a second detection unit comprises fixing said second detection unit with respect to said parking space, said first identification code identifying the first vehicle, said second identification code identifying said parking space.

8. A system for determining the occupation state of a parking space, said occupation state being alternatively free, if said parking space is not occupied by any vehicle, legitimately occupied, if said parking space is occupied by an authorized vehicle, or illegitimately occupied, if said parking space is occupied by an unauthorized vehicle, said system comprising:
   a first detection unit including an electronic device, the electronic device comprising:

a detector, including a frequency modulated continuous wave radar and configured to detect, by means of said radar, the presence of a vehicle within a parking space; and
a first transmitter, including said radar and configured to transmit, by means of said radar, a first communication signal, said first communication signal being modulated on the basis of a first identification code, alternatively indicating either a vehicle or a parking space;
a decision unit; and
a second detection unit comprising:
a second receiver configured to receive said first communication signal;
a demodulator configured to demodulate said first identification code starting from said first communication signal; and
a second transmitter configured to transmit said first identification code to the decision unit;
and wherein said decision unit is configured to determine said occupation state on the basis of said first identification code and a second identification code, alternatively indicating either a parking space or a vehicle.

9. The determination system according to claim 8, wherein said second receiver comprises a first generator configured to generate an acquired signal on the basis of said first communication signal, and wherein said demodulator comprises:
a second generator configured to generate a listening signal which is frequency-modulated on the basis of a periodic reception signal, said periodic reception signal having a reception frequency different from said transmission frequency;
a multiplier configured to multiply said acquired signal by said listening signal, generating a mixed signal;
a filter configured to filter said mixed signal, generating a filtered signal; and
a processing unit configured to detect, within said filtered signal, the presence/absence of peaks spaced by the transmission frequency.

10. A method for determining the occupation state of a parking space, said occupation state being alternatively free, if said parking space is not occupied by any vehicle, legitimately occupied, if said parking space is occupied by an authorized vehicle, or illegitimately occupied, if said parking space is occupied by an unauthorized vehicle, said method comprising the steps of:
providing a first detection unit comprising a radar of the frequency modulated continuous wave radar type;
providing a decision unit and a second detection unit, the second detection unit having a reception band;
individually selecting each logic value of a plurality of logic values of a first identification code, alternatively indicating said parking space or a vehicle, and transmitting via said radar a corresponding portion of a first communication signal, the frequency of which is modulated on the basis of a periodic transmission signal within a transmission band at least partially overlapping said reception band if the selected logic value of the plurality of logic values is a first logic value, or otherwise is outside said reception band if the selected logic value of the plurality of logic values is a second logic value;
receiving said first communication signal by said second detection unit;
demodulating said first identification code by said second detection unit starting from said first communication signal;
transmitting said first identification code by said second detection unit to the decision unit;
acquiring a second identification code, alternatively indicating a vehicle or said parking space, by said decision unit; and
determining said occupation state by said decision unit on the basis of said first and second identification code.

11. The determination method according to claim 10, wherein said periodic transmission signal has a transmission frequency and wherein said step of demodulating said first identification code comprises, by said second detection unit:
generating an acquired signal on the basis of said first communication signal;
generating a frequency modulated listening signal on the basis of a periodic reception signal, said periodic reception signal having a reception frequency different from said transmission frequency;
multiplying said acquired signal by said listening signal, generating a mixed signal;
filtering said mixed signal, generating a filtered signal; and
detecting, within said filtered signal, the presence/absence of peaks spaced by the transmission frequency.

12. The determination method according to claim 11, wherein said listening signal has a frequency that varies within a listening band, said reception band and said transmission band both being the same as the listening band.

13. An electronic device comprising:
a detector including a radar of the frequency modulated continuous wave radar type and configured to detect the presence of a vehicle within a parking space by means of said radar; and
a first transmitter including:
a selector configured to individually select each logic value of a first identification code, alternatively indicating said parking space or a vehicle; and
an emitter configured to emit via said radar, for each logic value selected by the selector, a corresponding portion of a first communication signal, the frequency of which is modulated on the basis of a periodic transmission signal within a transmission band if the selected logic value is a first logic value, or otherwise is outside said transmission band if the selected logic value is a second logic value.

14. A system for determining the occupation state of a parking space, said occupation state being alternatively free, if said parking space is not occupied by any vehicle, legitimately occupied, if said parking space is occupied by an authorized vehicle, or illegitimately occupied, if said parking space is occupied by an unauthorized vehicle, said system comprising:
a first detection unit including an electronic device, the electronic device comprising:
a detector including a radar of the frequency modulated continuous wave radar type and configured to detect the presence of a vehicle within a parking space by means of said radar; and
a first transmitter including:
a selector configured to individually select each logic value of a first identification code, alternatively indicating said parking space or a vehicle; and
an emitter configured to emit via said radar, for each logic value selected by the selector, a corresponding portion of a first communication signal, the frequency of which is modulated on the basis of a periodic transmission signal within a transmission band if the selected logic value is a first logic value, or otherwise is outside said transmission band if the selected logic value is a second logic value;
a decision unit; and
a second detection unit having a reception band and comprising:
a receiver configured to receive said first communication signal;
a demodulator configured to demodulate said first identification code starting from said first communication signal; and
a second transmitter configured to transmit said first identification code to the decision unit;
wherein said transmission band at least partially overlaps said reception band, and said emitter is further configured such that, if the selected logic value is the second logic value, the frequency of said corresponding portion of the first communication signal is outside said reception band; and wherein said decision unit is configured to acquire a second identification code, alternatively indicating a vehicle or said parking space, and to determine said occupation state on the basis of said first and second identification code.

15. The determination system according to claim 14, wherein the periodic transmission signal has a transmission frequency and wherein said receiver comprises a first generator configured to generate an acquired signal on the basis of said first communication signal, and wherein said demodulator comprises:
a second generator configured to generate a listening signal which is frequency-modulated on the basis of a periodic reception signal, said periodic reception signal having a reception frequency different from said transmission frequency;
a multiplier configured to multiply said acquired signal by said listening signal, generating a mixed signal;
a filter configured to filter the mixed signal, generating a filtered signal; and
a processing unit configured to detect, within said filtered signal, the presence/absence of peaks spaced by the transmission frequency.

16. The determination system according to claim 15, wherein said listening signal has a frequency that varies within a listening band, said reception band and said transmission band both being the same as the listening band.

* * * * *